United States Patent [19]

Wong et al.

[11] Patent Number: 5,106,632

[45] Date of Patent: Apr. 21, 1992

[54] ENHANCED SWEETNESS OF ACESULFAME-K IN EDIBLE COMPOSITIONS

[75] Inventors: Lucy L. Wong, Jackson Heights, N.Y.; Steven M. Faust, Stanhope; Subraman R. Cherukuri, Towaco, both of N.J.

[73] Assignee: Warner-Lambert Company, Morris Plains, N.J.

[21] Appl. No.: 468,537

[22] Filed: Jan. 23, 1990

[51] Int. Cl.⁵ .................... A23G 3/30; A23L 1/22
[52] U.S. Cl. ............................ 426/3; 426/96; 426/548; 426/804; 426/576; 426/549; 426/590; 426/599
[58] Field of Search ........... 426/548, 804, 3-6, 426/96, 576, 549, 590, 599

[56] References Cited

U.S. PATENT DOCUMENTS

| | | | |
|---|---|---|---|
| 4,151,270 | 4/1979 | Ream | 426/5 |
| 4,551,342 | 11/1985 | Nakel et al. | 426/548 |
| 4,552,771 | 11/1985 | Fülberth et al. | 426/548 |

*Primary Examiner*—Jeanette Hunter
*Attorney, Agent, or Firm*—Craig M. Bell; Richard S. Bullitt

[57] ABSTRACT

An acesulfame-K containing composition exhibiting enhanced sweetness comprises one or more food grade acids, acesulfame-K and potassium chloride.

42 Claims, 2 Drawing Sheets

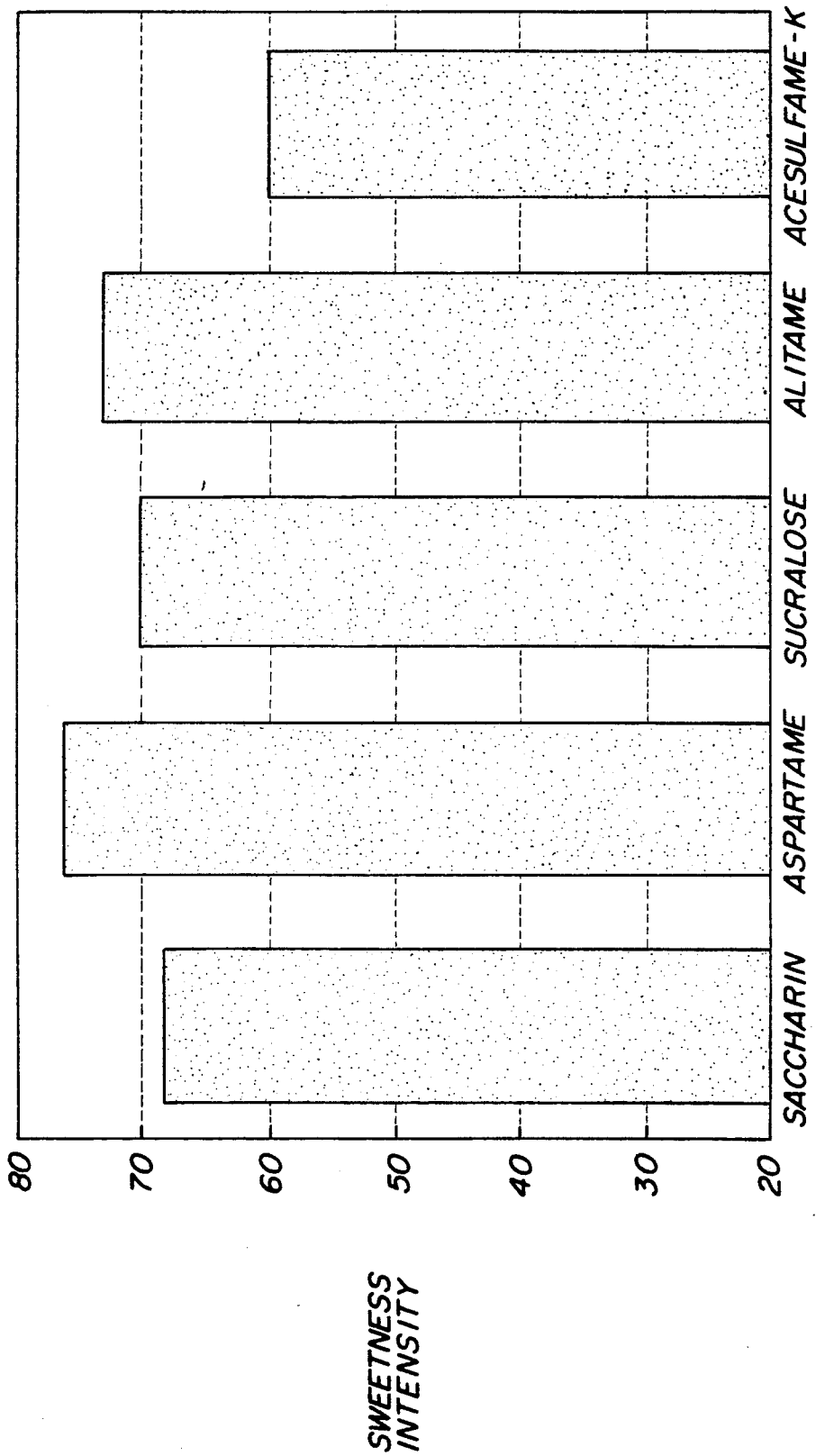

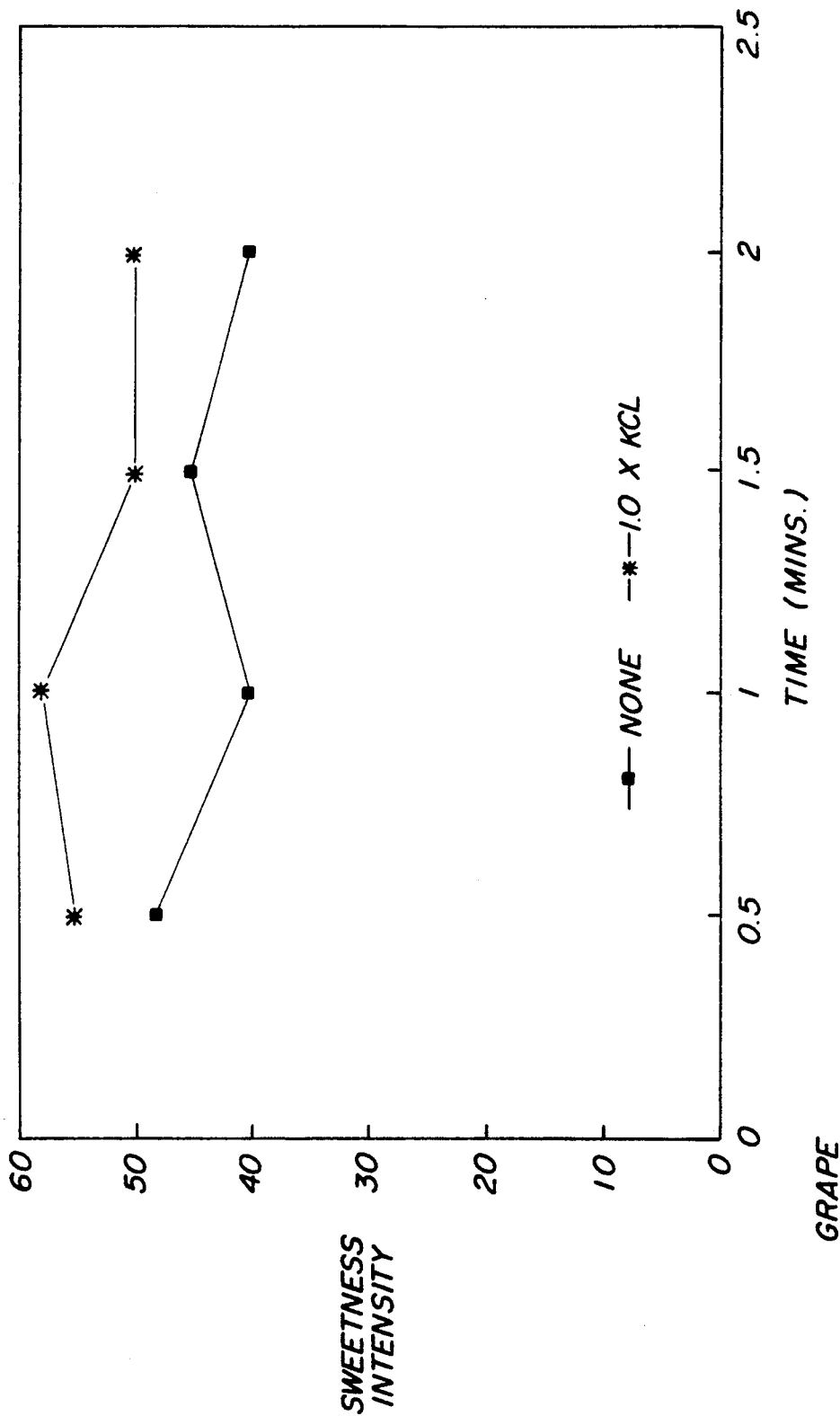

ENHANCED SWEETNESS OF ACESULFAME-K IN EDIBLE COMPOSITIONS

BACKGROUND OF THE INVENTION

1. Field of the Invention:

The present invention relates to sweetening agents, and particularly to the enhancement of the sweetness of acesulfame-K in edible compositions, such as sour chewing gum compositions.

2. Description of the Prior Art:

A variety of intense sweeteners have been traditionally used in edible compositions. The sweetness and sweetening power of these intense sweeteners vary considerably, depending upon the sweetener selected and the particular type of edible composition being formed. For example, saccharin, acesulfame-K and the cyclamates exhibit bitter taste notes, as opposed to aspartame, sucralose and alitame, which generally do not.

The sweetening power of traditionally employed intense sweeteners, as compared to sucrose, is as follows:

| | |
|---|---|
| Saccharin | 300X |
| Acesulfame-K | 200X |
| Cyclamates | 30X |
| Aspartame | 200X |
| Sucralose | 600X |
| Alitame | 2000X |

In addition to the considerable differences in sweetening power, intense sweeteners exhibit a range of stabilities. For example, aspartame degrades in the presence of water, aldehydes, ketones of cinnamon flavor and heat.

Acesulfame-K is a known stable sweetener which has been conventionally employed in a variety of food products. However, a notable shortcoming of acesulfame-K as a sweetener in edible materials is its bitter taste.

Efforts have been made to negate the bitter taste of acesulfame-K. For example, European Patent Application No. 0,122,400A1, assigned to Takeda Chemical Industries, discloses the admixing of acesulfame-K with members selected from the group consisting of alanine, glycine, histidine, arginine, glutamate, glutamic acid and its sodium salt, sodium-5-inosinate, sodium-5-guanylate, tartaric acid and its salts, and disodium phosphate. This patent alleges to mitigate the bitter taste of acesulfame-K to impart an improved quality of sweetness.

Additionally, a number of prior patents have disclosed a synergistic action between two classes of sweetening agents, such as acesulfame-K with other sweeteners. In this regard, U.S. Pat. No. 4,495,170 provides synergized compositions containing a mixture of different sweetening agents, at least one of which is saccharine, stevioside, acesulfame-K or other bitter tasting sweetening agent, with at least one sweet chlorodeoxysugar sweetener selected from the group consisting of chlorodeoxysucrose and chlorodeoxygalactosucrose.

U.S. Pat. No. 4,158,068 discloses a sweetener mixture which is said to have an improved saccharose-like taste consisting of acetosulfame and at least one sweetener selected from the group consisting of aspartyl peptide esters, the sulfamate sweeteners, the sulfimide sweeteners and the dihydrochalcone sweeteners.

U.S. Pat. No. 4,536,396 discloses the combination of 6-methyl-1, 2, 3-oxathiazin-4(3H)-one-2, 2-dioxide (acesulfame) with 3-(L-aspartyl-D-alaninamido)-2,2,4,4-tetra-methylthietane which is said to mask the bitter notes of the oxathiazin and also provide a synergistic sweetness over a range of concentrations.

When acesulfame-K is used in products containing food acids, such as sour chewing gum compositions, the perceived sweetness and sourness intensities of the products are lower than would be expected at the same sucrose equivalent of saccharine. This sweetness antagonism of acesulfame-K in the presence of food acids presents an additional difficulty which has heretofore limited the use of acesulfame-K in edible compositions. One possible way to perceive more sweetness in acesulfame-K containing edible compositions would be to add additional acesulfame-K to compensate for the reduced sweetness and sourness intensities. However, this solution is impractical, as such would result in an enhanced bitter flavor of the edible product. An alternative approach is disclosed in Japanese Patent Application 61,268,154, which teaches the coating of acesulfame-K with dextrin, in order to prevent the instability of the acesulfame salts when contacted with organic acids.

Despite the above-mentioned efforts, it is generally agreed that intense sweeteners such as acesulfame-K exhibit unacceptable bitter notes, even when used in conjunction with other sweeteners, and further that sweeteners such as acesulfame-K when employed in the presence of food acids exhibit reduced sourness and sweetness sensations which are unacceptable.

SUMMARY OF THE INVENTION

Applicants have unexpectedly discovered a sweet-tasting composition which comprises: one or more food grade acids, acesulfame or cationic salt thereof, and potassium chloride.

Applicants have further discovered a method for enhancing the sweet taste of acesulfame or a cationic salt thereof, which comprises: combining with said acesulfame or cationic salt one or more food grade acids, and potassium chloride.

In a preferred aspect of the invention, it has been unexpectedly discovered to form a sour chewing gum composition which comprises:

(a) from about 20 to about 90% by weight of a water-insoluble gum base;

(b) from about 55 to about 65% by weight of a bulk sweetener comprising a sugar or sugarless sweetener;

(c) from about 1.0 to about 2.5% by weight of one or more food grade acids selected from the group consisting of fumaric acid, adipic acid, succinic acid, citric acid, butyric acid, capric acid, tartaric acid, malic acid and mixtures thereof;

(d) from about 0.01 to about 2.0% by weight of acesulfame-K; and (e) from about 0.1 to about 1.0% by weight of potassium chloride, based on the total weight of said chewing gum composition.

In another aspect of the invention, a method of preparing a sour chewing gum composition comprises:

(a) providing a mixture of gum base, a bulk sweetener, one or more food grade acids, acesulfame-K and potassium chloride;

(b) forming a chewing gum composition from said mixture; and (c) recovering said chewing gum composition.

BRIEF DESCRIPTION OF THE DRAWINGS

FIG. 1 illustrates the perceived sweetness intensities of a variety of intense sweeteners in the presence of a food grade acid.

FIG. 2 shows the perceived sweetness intensities over time of chewing gum compositions prepared in accordance with the invention.

DESCRIPTION OF THE INVENTION

Applicants have unexpectedly discovered a novel sweet-tasting composition which comprises: one or more food grade acids, acesulfame or cationic salt thereof, and potassium chloride.

Edible compositions formed with the above-described components yield a product which exhibits improved sweetness intensity.

The invention comprises a unique combination of three essential components, namely one or more food grade acids, acesulfame or cationic salt thereof, and potassium chloride. In the absence of any one of these components from the formulations of this invention, compositions may be prepared which do not exhibit the enhanced effect achieved from this combination.

Acesulfame-K, which is the preferred form of the intense sweetener utilized in accordance with the present invention, is the edible potassium salt of acesulfame, 6-methyl-1,2,3-oxathiazin-4(3H)-one-2,2-dioxide, and has the formula:

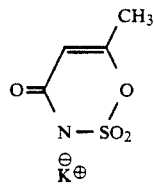

Acesulfame is most conveniently used in the form of its potassium salt, but it should be understood that other cationic or acid addition salt forms may be utilized with the compositions and methods of the present invention. The potassium salt of acesulfame employed herein is commercially available.

The acesulfame-K used in the edible compositions of the invention may generally be employed in amounts of from about 0.01 to about 2.0% and preferably from about 0.1 to about 1.0% by weight of the total edible composition.

Edible compositions prepared according to the invention contain food grade acids, which may be either easily extractable or poorly water-soluble. Exemplary food grade acids utilized in the present invention include those selected from the group consisting of fumaric acid, adipic acid, succinic acid, citric acid, butyric acid, capric acid, tartaric acid, malic acid and mixtures thereof. These food grade acids are used in the edible compositions in order to impart a taste or sensation of sourness to the edible composition.

The food acids are generally useful in the edible compositions of the invention in amounts of from about 0.5 to about 4.0%, and preferably are used in amounts of from about 1.0 to about 2.5% by weight, based on the total weight of the edible composition.

Potassium chloride, KCl, is the final essential component of the edible formulations of the invention. Potassium chloride is a commercially available alkali metal salt which unexpectedly provides the acesulfame-K containing composition of the invention with an enhanced sweetness intensity, while minimizing the bitter notes traditionally associated with acesulfame-K.

It has been unexpectedly discovered not only that addition of potassium chloride to a food grade acid containing edible composition provides an enhanced sweetness sensation of acesulfame-K in the composition, but also that the degree of sweetness enhancement attained depends upon the particular amount of KCl employed for a given quantity of acesulfame-K. Examples 7–12 illustrate this aspect of the invention. As set forth therein, the potassium chloride is most preferably employed in an amount approximately equal to that of the acesulfame-K. If the amount of KCl employed is too small, the composition will have insufficient sweetness qualities and may taste bitter. Conversely, if the concentration of KCl is too high, the compositions will be salty tasting.

In general, the potassium chloride may be utilized in amounts of from about 0.01 to about 2.0%, and preferably from about 0.1 to about 1.0% by weight of the total edible composition.

The compositions of the present invention provide advantageous sweetening agents, in view of their high potency, their physical form and stability at ordinary use levels. The components of the compositions can be employed separately, that is in solid forms such as powders, tablets, granules and dragees; and liquid forms such as solutions, suspensions, syrups, emulsions as well as other commonly employed forms particularly suited for combination with oral products. These product forms can consist of each individual component, alone, or in association with suitable non-toxic carriers, including sweetening agent carriers, i.e., non-toxic substances commonly employed in association with sweetening agents. Such suitable carriers include water, sorbitol, mannitol, lactitol, maltitol, palatinit, vegetable or mineral oils, corn syrup solids, lactose, cellulose, starch, dextrins, modified starches, polysaccharides such as polydextrose, calcium phosphate (mono-, di- or tribasic) and calcium sulfate.

The compositions of the invention are useful in oral products which include, but are not limited to, foods or beverages, e.g., a gelatin dessert or pudding, or dry-mix therefore, a confection or chewing gum, a flavored carbonated drink, a fruit flavored non-carbonated drink or dry-mix therefore, a canned or preserved fruit or fruit juice, or a baked product such as a cake or cookie; a solution or dry powder for use as a table sweetener (i.e., for sweetening edible foods and beverages at the point of consumption); oral hygienic products (such as mouthwash, tooth paste and tooth powder); and formulated medicinal and pharmaceutical agents.

Particularly preferred formulations are prepared from commercially available materials using standard techniques. Preferred products that employ the inventive compositions are chewing gum and confectionery products.

The chewing gum formulations of this invention generally contain a gum base, a bulk sweetener, acesulfame, or its cationic salts, one or more food grade acids and potassium chloride. Such chewing gum compositions, which contain a food acid to impart an initial sour flavor sensation to the gum, are generally referred to as "sour" chewing gum compositions.

The gum base used in the chewing gum formulations of the invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, balata, gutta-percha, lechi caspi, sorva, guayule rubber, crown gum and mixtures thereof. Synthetic elastomers such as butadiene-styrene copolymers, isobutylene-isoprene copolymers, polyethylene, polyisobutylene, polyvinylacetate and mixtures thereof, are particularly useful.

The amount of gum base employed will vary considerably depending on various factors such as the type of base used, consistency desired and other components used to make the final product. In general, amounts of about 20% to about 90% by weight of the final chewing gum composition are acceptable for use in the present invention, with amounts of from about 15 to about 40% by weight being preferred.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester or partially hydrogenated wood rosin or gum, pentaerythritol ester of wood rosin or gum, glycerol ester of polymerized rosin, glycerol ester of tall oil rosin, glycerol ester of wood rosin or gum and partially hydrogenated wood rosin or gum, and partially hydrogenated methyl ester or rosin and mixtures thereof. The solvent may be employed in an amount ranging from about 10% to about 75%, and preferably from about 45% to about 70%, by weight of the gum base.

A variety of traditional ingredients used as plasticizers or softeners such as lanolin, stearic acid, sodium stearate, potassium stearate, glyceryl triacetate, glycerin and the like, may be incorporated into the gum base to obtain a variety of desirable textures and consistency properties. The additional materials are generally employed in amounts of up to about 30% by weight and preferably in amounts of from 3% to about 7% by weight of the final gum base composition.

Chewing gum compositions prepared in accordance with the present invention generally contain a bulk sweetener. The bulk sweetening agent may generally be selected from the group consisting of water-soluble sweetening agents, sugar alcohols, sugar-containing sweeteners and mixtures thereof. Without being limited to particular sweeteners, representative bulk sweeteners encompass:

Water-soluble sweetening agents such as monosaccharides, disaccharides and polysaccharides such as xylose, ribose, glucose (dextrose), mannose, galactose, fructose (levulose), sucrose (sugar), maltose invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, lactitol, maltitol, palatinit, hydrogenated starch hydrolysate and mixtures thereof.

Generally, the bulk sweetener may be employed in amounts of from about 4 to about 79.49% by weight, and preferably from about 56.5 to about 83.9% by weight, based on the total weight of the chewing gum composition.

In addition to the above-described acesulfame-K intense sweetener and bulk sweeteners, the chewing gum compositions of the invention may optionally include one or more additional sweeteners selected from the following categories:

(a) Water-soluble artificial sweeteners such as the soluble saccharin salts, i.e., sodium and calcium saccharin salts, cyclamate salts, and the like, and the free acid form of saccharin;

(b) Dipetide based sweeteners such as L-aspartyl-L-phenylalanine methyl ester and materials described in U.S. Pat. No. 3,492,131, L-alpha-aspartyl-N-(2,2,4,4-tetramethyl-3-thietanyl)-D-alaninamide hydrate, and the like;

(c) Water-soluble sweeteners derived from naturally occurring water-soluble sweeteners, such as chlorinated derivatives of ordinary sugar (sucrose), known for example under the product designation of sucralose; and (d) Protein based sweeteners such as thaumatin.

The above-described additional sweeteners may be used in amounts of about 0.005% to about 5.0%, and preferably from about 0.05% to about 5.0% by weight of the final edible composition.

In addition to the above-described components, the inventive edible formulations may contain flavoring agents well known in the foods art. The flavoring agents may be chosen from synthetic flavor oils and/or oils derived from plants, leaves, flavors, fruits and so forth, and combinations thereof. Representative flavor oils include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit, as well as fruit essences including apple, strawberry, cherry, pineapple and so forth. The flavoring agents may be utilized in amounts well known to those skilled in the art.

The edible compositions of the invention may additionally include the conventional additives of coloring agents; emulsifiers such as lecithin and glyceryl monosterate; and additional fillers such as aluminum hydroxide, alumina, aluminum silicates, calcium carbonate, talc and combinations thereof. Preferably the amounts of fillers when used will vary from 4% to about 30% by weight, depending on the particular edible product being produced.

The colorants useful in the present invention include pigments such as titanium dioxide, and may also include dyes suitable for food, drug and cosmetic application. These colorants are known as F.D. & C. dyes. The materials acceptable for the foregoing spectrum of uses are preferably water-soluble. Illustrative examples include indigo dye, known as F.D. & C. Blue No. 2, which is the disodium salt of 5,5'-indigotindi-sulfonic acid. Similarly, the dye known as F.D. & C. Green No. 1, comprises a triphenylmethane dye and is the monosodium salt of the 4-[4-Nethyl-p-sulfobenzylamino) diphenylmethylene]-[1-N-ethyl-N-P-sulfo-benzyl)-2, 5-cyclohexadienimini]. A full recitation of F.D. & C. and D. & C. colorants and their corresponding chemical structures may be found in the Kirk-Othmer Encyclopedia of Chemical Technology, 3rd Edition, in Volume 6, at pages 561–595.

The present invention also contemplates methods of preparing the novel edible compositions of the invention.

Generally, the invention contemplates a method for enhancing the sweet taste of acesulfame or a cationic salt thereof, which comprises: combining one or more food grade acids and potassium chloride with said acesulfame or cationic salt.

As stated above, the acesulfame and potassium chloride are preferably utilized in approximately equal amounts.

Sour chewing gum compositions may be prepared by:

(a) providing a mixture of a gum base, a bulk sweetener, one or more food grade acids, acesulfame-K and potassium chloride;

(b) forming a chewing gum composition from said mixture; and (c) recovering said chewing gum composition.

According to another method, a sour chewing gum composition is prepared by a method which comprises:

(a) providing a mixture of a gum base, a bulk sweetener selected from the group consisting of water-soluble sweetening agents, sugar alcohols, sugar-containing sweeteners and mixtures thereof, one or more water-soluble artificial sweeteners, one or more food grade acids, acesulfame-K and potassium chloride;

(b) forming a chewing gum composition from said mixture; and (c) recovering said chewing gum composition.

Alternatively, a method for preparing sour chewing gum compositions in accordance with the invention comprises:

(a) providing a premixture of a gum base, a bulk sweetener, one or more food grade acids, acesulfame-K and potassium chloride;

(b) adding to said premixture additional materials selected from the group consisting of plasticizers, softeners, filler emulsifiers, colors and mixtures thereof, to form a mixture;

(c) forming a chewing gum composition from said mixture; and (d) recovering said chewing gum composition.

A particularly preferred method for preparing sour chewing gum compositions according to the invention comprises:

(a) providing a mixture of:

i. from about 20 to about 90% by weight of a water-insoluble gum base;

ii. from about 55 to about 65% by weight of a bulk sweetener comprising a sugar or sugarless sweetener;

iii. from about 1.0 to about 2.5% by weight of one or more food grade acids selected from the group consisting of fumaric acid, adipic acid, succinic acid, citric acid, butyric acid, capric acid, tartaric acid, malic acid and mixtures thereof;

iv. from about 0.01 to about 2.0% by weight of acesulfame-K; and v. from about 0.1 to about 1.0% by weight of potassium chloride, based on the total weight of said sour chewing gum composition;

(b) forming a chewing gum composition from said mixture; and (c) recovering said chewing gum composition.

The means for mixing the gum base, bulk sweetener, food grade acids, acesulfame-K and potassium chloride is conventionally known to those skilled in the art. In general, regard, no particular adjustment of manufacturing procedures is necessary to prepare the novel edible compositions of the invention.

Chewing gum compositions made from the instant process may be of the sugar or sugarless variety and may be formulated into regular or non-adhering chewing gum pieces. Bubble gum, stick gum, pillow shaped, chunk, coated, and other gum piece forms well known to the art are contemplated. If a sugarless gum is desired, then the fruit juice may be of the sour citrus variety with no or negligible sugar content, e.g., lemon and lime.

A suitable process for preparing chewing gum compositions according to the present invention comprises adding to a suitable gum kettle a melted blend of gum base and corn syrup and mixing until homogenous. Usually a homogenous mass is obtained in about six minutes at a temperature of about 55° to about 65° C. Sugar, or other suitable sweeteners, and color are then blended into the homogenous mass for approximately two minutes. The acesulfame-K, food acids and KCl, together with flavoring agents are then added to the composition and mixed until sufficiently homogeneous.

The following examples are given to illustrate the invention, but are not deemed to be limiting thereof. All percentages given throughout the specification are based upon the weight of the final edible composition unless otherwise indicated.

EXAMPLES 1-5

Preparation of Intense Sweetener/Food Acid Solutions

The following examples illustrate the average sweetness intensities of a variety of intense sweeteners in a food grade acid containing solution.

An expert panel was asked to evaluate the sweetness of the following solutions (0 being no sweetness, 100 being very high sweetness):

|  | Ex 1 | Ex 2 | Ex 3 | Ex 4 | Ex 5 |
|---|---|---|---|---|---|
| Malic Acid | 1.135% | 1.135% | 1.135% | 1.135% | 1.135% |
| Sodium Saccharin | 0.2% | — | — | — | — |
| Aspartame | — | 0.3% | — | — | — |
| Sucralose | — | — | 0.1% | — | — |
| Alitame | — | — | — | 0.03% | — |
| Acesulfame-K | — | — | — | — | 0.3% |

The average sweetness intensity for each of the above solutions is set forth in FIG. 1.

As illustrated therein, the sweetness of acesulfame-K with malic acid is lower than the sweetness of all of the other sweeteners with malic acid, despite the use of each sweetener in amounts which should provide solutions of equivalent sweetness.

EXAMPLE 6

Preparation of Acesulfame-K Solutions With Other Food Grade Acids

Following the procedure of Examples 1-5, solutions of acesulfame-K with citric acid and tartaric acid were prepared.

Each of these solutions was evaluated by an expert panel with respect to sweetness intensity.

The sweetness intensities of the acesulfame-K/citric acid and acesulfame-K/tartaric acid solutions were found to be similar to the sweetness intensity of the acesulfame-K/malic acid solution.

Therefore, Examples 1-5 illustrate that acesulfame-K loses its sweetness in the presence of food grade acids, and further that this sweetness antagonism between acesulfame-K and food acids occurs with a variety of food acids.

EXAMPLE 7-12

Preparation of Food Acid/Acesulfame-K/KCl Solutions

The following examples illustrate the effect of varying concentrations of potassium chloride on the taste of food grade acid/acesulfame-K solutions.

Solutions having constant concentrations of malic acid and acesulfame-K, and varying concentrations of KCl were prepared, as follows:

|  | Ex 7 | Ex 8 | Ex 9 | Ex 10 | Ex 11 | Ex 12 |
| --- | --- | --- | --- | --- | --- | --- |
| Malic Acid | 1.13% | 1.13% | 1.13% | 1.13% | 1.13% | 1.13% |
| Acesulfame-K | 0.3% | 0.3% | 0.3% | 0.3% | 0.3% | 0.3% |
| KCl | — | 0.07% | 0.3% | 0.75% | 1.5% | 3.0% |

Following the procedure of Examples 1-6, the above solutions were evaluated by an expert panel with regard to sweetness.

The solutions of Examples 11 and 12 were found to be salty, indicating that the concentrations of KCl employed in these solutions were too high.

The solution of Example 8 was found to be at most directionally sweeter than the solution of Example 7.

The solutions of Examples 9 and 10 were found to be sweeter than the solution of Example 7, with the solution of Example 9 exhibiting better sweetness than the solution of Example 10.

Examples 7-12 therefore indicate that addition of KCl to food acid/acesulfame-K solutions improves the sweetness quality of the solutions, to a degree dependent upon the concentration KCl utilized. Very low concentrations of KCl provide little or no improvement of sweetness, whereas overly high concentrations of KCl produce salty tasting solutions. Optimum sweetness improvement is provided when approximately equal amounts of acesulfame-K and KCl are employed in the solution.

EXAMPLES 13-16

Preparation of Sour Chewing Gum Compositions

The following examples illustrate the preparation of sour chewing gum compositions in accordance with the present invention.

Sour chewing gum compositions were prepared, using the following ingredients:

|  | Ex 13 | Ex 14 | Ex 15 | Ex 16 |
| --- | --- | --- | --- | --- |
| Acesulfame-K | 0.25 | 0.25 | 0.25 | 0.25 |
| KCl | — | 0.125 | 0.25 | 0.50 |
| Food Acids | 1.35 | 1.35 | 1.35 | 1.35 |
| Bulk Sweetener | 59.2 | 59.075 | 58.95 | 58.70 |
| Softeners | 14.8 | 14.8 | 14.8 | 14.8 |
| Color | 0.4 | 0.4 | 0.4 | 0.4 |
| Fruit Flavor | 1.0 | 1.0 | 1.0 | 1.0 |
| Gum Base | 23.0 | 23.0 | 23.0 | 23.0 |

The above chewing gum compositions were evaluated by an expert panel with respect to sweetness, following the procedure of Examples 1-12. The expert panel was asked to chew and evaluate the chewing gums for sweetness at 0.5, 1, 1.5 and 2 minute time stations.

The chewing gum of Example 14 was found to be sweeter than the gum of Example 13 at the 1 minute time station.

The chewing gum composition of Example 16 was found to be sweeter than the gum of Example 13 from the beginning, up to 1 minute of chew.

The chewing gum composition of Example 15 was found to be sweeter than the composition of Example 13 at all time stations tested.

The sweetness intensity vs. time data for the chewing gum compositions of Examples 15 and 13 is set forth in FIG. 2.

As illustrated therein, the chewing gum composition of Example 15, which has equal amounts of acesulfame-K and KCl, exhibits consistently improved sweetness compared to the chewing gum composition of Example 13, which does not include KCl.

The invention being thus described, it will be obvious that the same may be varied in many ways. Such variations are not to be regarded as a departure from the spirit and scope of the invention and all such modifications are intended to be included within the scope of the following claims.

What is claimed is:

1. A sweet-tasting composition comprising a mixture of acesulfame or cationic salt thereof, one or more food grade acids, and potassium chloride, said potassium chloride being present in an amount sufficient to enhance the sweet taste of acesulfame or the cationic salt thereof.

2. The composition of claim 1, wherein said acesulfame and potassium chloride are present in approximately equal amounts.

3. The composition of claim 1 wherein the composition is an edible food or beverage.

4. The composition of claim 3 wherein the edible food is a gelatin dessert, a pudding, or a dry mix therefor.

5. The composition of claim 3 wherein the edible food is a confection or chewing gum.

6. The composition of claim 3 wherein the edible food or beverage is a flavored carbonated drink.

7. The composition of claim 3 wherein the edible food or beverage is a non-carbonated fruit flavored drink, or dry mix therefor.

8. The composition of claim 3 wherein the edible food or beverage is a canned or preserved fruit or fruit juice.

9. The composition of claim 3 wherein the edible food is a cake, cookie or other baked product.

10. The composition of claim 1 wherein the composition for oral use is a liquid or dry powder for use as a table sweetener.

11. A chewing gum composition comprising a gum base, a bulk sweetener, acesulfame or cationic salt thereof, one or more food grade acids and potassium chloride, said potassium chloride being present in an amount sufficient to enhance the sweet taste of acesulfame or the cationic salt thereof.

12. The chewing gum composition of claim 11, wherein said gum base is present in amounts of from about 20 to about 90% by weight, said food grade acids are present in amounts of from about 0.5 to about 4.0% by weight, said acesulfame is present in amounts of from about 0.01 to about 2.0% by weight, said potassium chloride is present in amounts of from about 0.01 to about 2.0% by weight, said composition comprising a remaining amount up to 100% by weight of a bulk carrier, based on the total weight of said chew gum composition.

13. The chewing gum composition of claim 12, wherein said gum base is present in amounts of from about 15 to about 40% by weight, said food grade acids are present in amounts of from about 1.0 to about 2.5% by weight, said acesulfame is present in amounts of from about 0.1 to about 1.0% by weight, said potassium chloride is present in amounts of from about 0.1 to about 1.0% by weight, said composition comprising a remaining amount up to 100% by weight of a bulk carrier, based on the total weight of said chewing gum composition.

14. The chewing gum composition of claim 11, wherein said gum base comprise a natural or synthetic rubber.

15. The chewing gum composition of claim 14, wherein said natural or synthetic rubber is selected from has the group consisting of chicle, jelutong, balata gutta-percha, lechi caspi, sorva, guayule rubber and mixtures thereof.

16. The chewing gum composition of claim 14, wherein said synthetic rubber is selected from the group consisting of butadiene-styrene copolymers, polyisobutylene, isobutyleneisoprene copolymers and mixtures thereof.

17. The chewing gum composition of claim 11, wherein said food grade acids are selected from the group consisting of fumaric acid, adipic acid, succinic acid, citric acid butyric acid, capric acid, tartaric acid, malic acid and mixtures thereof.

18. The chewing gum composition of claim 11, wherein said chewing gum composition is selected from the group consisting of sugar-containing and sugarless chewing gums.

19. The chewing gum composition of claim 11, wherein said bulk sweetener is selected from the group consisting of water-soluble sweetening agents, sugar alcohols, sugar-containing sweeteners and mixtures thereof.

20. The chewing gum composition of claim 19, wherein said sugar alcohol is selected from the group consisting of sorbitol, xylitol, mannitol, lactitol, palatinit, maltitol and mixtures thereof.

21. The chewing gum composition of claim 11, further including a carrier selected from the group consisting of water, calcium phosphate, calcium sulfate, polydextrose and mixtures thereof.

22. The chewing gum composition of claim 11, further including a water-soluble artificial sweetener.

23. The chewing gum composition of claim 11, further including additional materials selected from the group consisting of plasticizers, softeners, fillers, emulsifiers, colors and mixtures thereof.

24. The chewing gum composition of claim 11, wherein said acesulfame-K and said potassium chloride are present in approximately equal amounts.

25. A chewing gum composition which comprises:
(a) from about 20 to about 90% by weight of a water-insoluble gum base;
(b) from about 1.0 to about 2.5% by weight of one or more food grade acids selected from the group consisting of fumaric acid, adipic acid, succinic acid, citric acid, butyric acid, capric acid, tartaric acid, malic acid and mixtures thereof;
(d) from about 0.01 to about 2.0% by weight of acesulfame-K; and
(e) from about 0.1 to about 1.0% by weight of potassium chloride, based on the total weight of said chewing gum composition.

26. A method of preparing a chewing gum composition, comprising:
(a) providing a mixture of gum base, a bulk sweetener, one or more food grade acids, acesulfame-K and potassium chloride, said potassium chloride being present in an amount sufficient to enhance the sweet taste of acesulfame-K.

27. The method of claim 26, wherein said gum base is present in amounts of from about 20 to about 90% by weight, said food grade acids are present in amounts of from about 0.5 to about 4.0% by weight, said acesulfame-K is present in amounts of from about 0.01 to about 2.0% by weight, said potassium chloride is present in amounts of from about 0.01 to about 2.0% by weight, said composition comprising a remaining amount up to 100% by weight of a bulk carrier, based on the total weight of said chewing gum composition.

28. The method of claim 27, wherein said gum base is present in amounts of from about 15 to about 40% by weight, said food grade acids are present in amounts of from about 1.0 to about 2.5% by weight, said acesulfame-K is present in amounts of from about 0.1 to about 1.0% by weight, said potassium chloride is present in amounts of from about 0.1 to about 1.0% by weight, said composition comprising a remaining amount up to 100% by weight of a bulk carrier, based on the total weight of said chewing gum composition.

29. The method of claim 26, wherein said base comprises a natural or synthetic rubber.

30. The method of claim 29, wherein said natural or synthetic rubber is selected from the group consisting of chicle, jelutong, balata, gutta-percha, lechi caspi, sorva, guayule rubber and mixtures thereof.

31. The method of claim 26, wherein said food grade acids are selected from the group consisting of fumaric acid, adipic acid, succinic acid, citric acid, butyric acid, capric acid, tartaric acid, malic acid and mixtures thereof.

32. The method of claim 26, wherein said chewing gum composition is selected from the group consisting of sugar-containing and sugarless chewing gums.

33. The method of claim 26, wherein said bulk sweetener is selected from the group consisting of water-soluble sweetening agents, sugar alcohols, sugar-containing sweeteners and mixtures thereof.

34. The method of claim 33 wherein said sugar alcohol is selected from the group of sorbitol, xylitol, lactitol, palatinit, mannitol, maltitol and mixtures thereof.

35. The method of claim 26, wherein said composition further includes a carrier selected from the group consisting of water, calcium phosphate, calcium sulfate, polydextrose and mixtures thereof.

36. The method of claim 26, wherein said acesulfame-K and said potassium chloride are present in approximately equal amounts.

37. A method of preparing a chewing gum composition, comprising:
(a) providing a mixture of a gum base, a bulk sweetener selected from the group consisting of water-soluble sweetening agents, sugar alcohols, sugar-containing sweeteners and mixtures thereof, one or more water-soluble artificial sweeteners, one or more food grade acids, acesulfame-K and potassium chloride, said potassium chloride being present in an amount sufficient to enhance the sweet taste of acesulfame-K;
(b) forming a chewing gum composition from said mixture; and (c) recovering said chewing gum composition.

38. A method of preparing a chewing gum composition, comprising:
(a) providing a premixture of a gum base, a bulk sweetener, one or more food grade acids, acesulfame-K and potassium chloride, said potassium chloride being present in an amount sufficient to enhance the sweet taste of acesulfame-K;
(b) adding to said premixture additional materials selected from the group consisting of plasticizers, softeners, fillers, emulsifiers, colors and mixtures thereof, to form a mixture;
(c) forming a chewing gum composition from said mixture; and
(d) recovering said chewing gum composition.

39. A method of preparing a chewing gum composition, comprising:
(a) providing a mixture of:
  i. from about 20 to about 90% by weight of a water-insoluble gum base;
  ii. from about 55 to about 65% by weight of a bulk sweetener comprising a sugar or sugarless sweetener;
  iii. from about 1.0 to about 2.5% by weight of one or more food grade acids selected from the group consisting of fumaric acid, adipic acid, succinic acid, citric acid, butyric acid, capric acid, tartaric acid, malic acid and mixtures thereof;
  iv. from about 0.01 to about 2.0% by weight of acesulfame-K; and
  v. from about 0.1 to about 1.0% by weight of potassium chloride, based on the total weight of said chewing gum composition;
(b) forming a chewing gum composition from said mixture; and
(c) recovering said chewing gum composition.

40. A method of enhancing the sweet taste of acesulfame or a cationic salt thereof, which comprises: combining one or more food grade acids and potassium chloride with said acesulfame or cationic salt, said potassium chloride being present in an amount sufficient to enhance the sweet taste of acesulfame or the cationic salt thereof.

41. The method of claim 40, wherein said acesulfame comprises acesulfame-K.

42. The method of claim 41, wherein said acesulfame-K and said potassium chloride are present in approximately equal amounts.

* * * * *